Feb. 22, 1949.　　　　E. H. RUSTIN　　　　2,462,131
SOLDERING IRON
Filed Oct. 14, 1942

Eugene H. Rustin
INVENTOR.

BY
Victor J. Evans & Co.
ATTORNEYS

Patented Feb. 22, 1949

2,462,131

UNITED STATES PATENT OFFICE 2,462,131

SOLDERING IRON

Eugene H. Rustin, Brooklyn, N. Y.

Application October 14, 1942, Serial No. 461,979

2 Claims. (Cl. 113—109)

My invention relates to soldering irons, and has among its objects and advantages the provision of an improved fountain type soldering iron wherein novel means are incorporated for supplying the iron with a quantity of molten solder, in which the iron is so designed as to maintain an effective temperature but to prevent overheating of the iron, and in which the construction is such as to facilitate manipulation of the iron.

Figure 1:
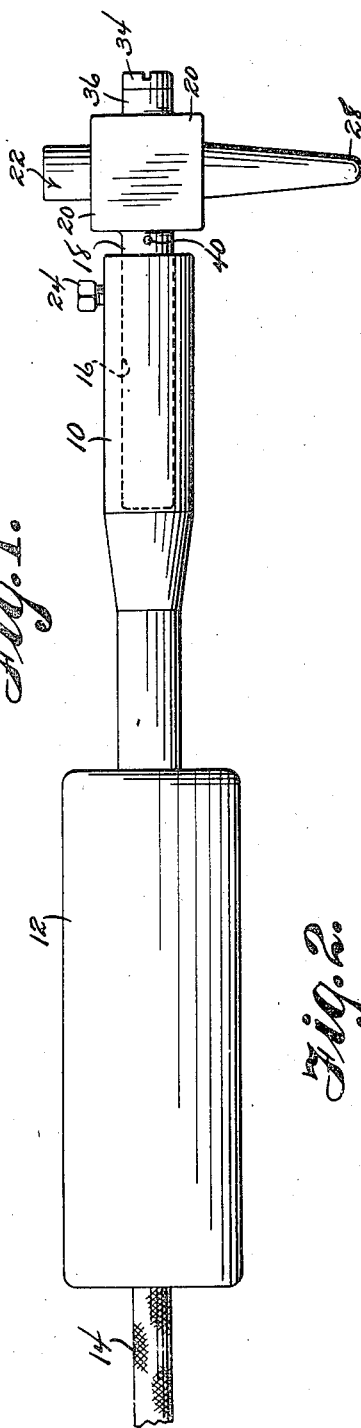
Figure 1 is a side view of a soldering iron in accordance with my invention.
Figure 2:
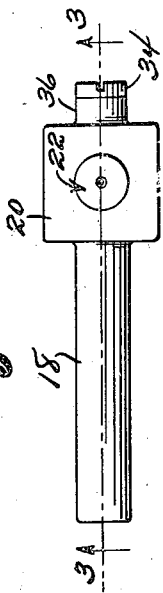
Figure 2 is a top view of a soldering nozzle supporting head.
Figure 3:
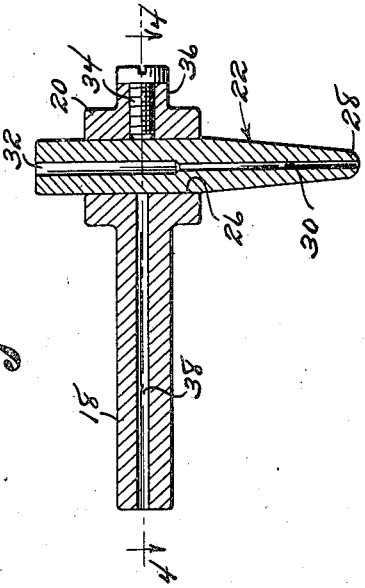
Figure 3 is a sectional view of the structure of Figure 2 and the soldering nozzle.
Figure 4:
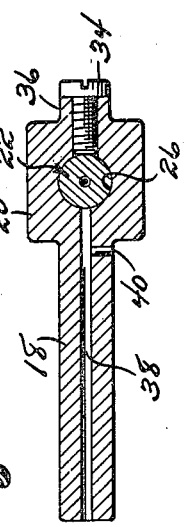
Figure 4 is a sectional view along the line 4—4 of Figure 3.

In the embodiment of the invention selected for illustration, I make use of an electrically heated shell 10 provided with a grip or handle 12 and supplied with a source of current through the medium of a cord 14 for connection with the usual wall outlet. The structure so far described is old and well known in the art.

The shell 10 is formed with a bore or socket 16 for the reception of a shank 18 on a head 20 which carries a soldering nozzle 22. The shank 18 fits snugly in the socket 16 and is made additionally secure by a set screw 24.

The shank 18 and the head 20 comprise a one piece member formed of Monel metal. The nozzle 22 comprises hard resilient copper. The nozzle 22 is of cylindrical formation throughout substantially half its length inwardly of its upper end, this part fitting snugly in a bore 26 through the head 20. The nozzle 22 is of tapered contour from a position adjacent the lower face of the head 20 to its lower end. This end is rounded at 28. A longitudinal bore 30 is provided in the nozzle, which bore is made with a No. 70 drill. The bore is coaxial with the nozzle. This bore is also coaxial with a second bore 32 extending through the upper end of the nozzle and made with a No. 69 drill. The bore 32 has a length slightly less than half the length of the nozzle.

The nozzle is made secure by a set screw 34 threaded through a boss 36 for end engagement with the nozzle 22. The shank 18 is circular in cross section and is provided with a longitudinal bore 38 extending into the bore 26. An air vent 40 is provided in the shank 18 adjacent the head 20.

I have found that by making the shank 18 of tubular form, with the bore 38 and the transverse air outlet passage 40 the heat conducting qualities of the shank are enhanced and that in providing the bore 30 of relatively small diameter in the lower part of the nozzle 22 with a bore of increased diameter in its upper part the molten solder is drawn up the longitudinal bore, by capillary attraction, while enabling the maintenance of a substantial quantity of the solder in the upper part thereof.

In operation, heat is transmitted to the soldering nozzle 22 through the medium of the head 20, the shank 18 and the shell 10. The nozzle is first heated and the end 28 is then contacted with the solder, after which the molten solder is drawn upwardly of the bore 30 and into the bore 32. Thus a supply of molten solder is carried in the nozzle. When the end 28 is brought into contact with the part or parts to be soldered, the solder releases for application to the parts in desired quantities. The molten solder flows from the nozzle only through contact between the nozzle and the work. A small drop of molten solder hangs from the rounded end of the nozzle, which facilitates application of the solder. This provides an iron which is fast in operation and one which facilitates soldered work in that a large number of spots may be soldered with one filling of the nozzle.

The nozzle 22 remains clean and eliminates the accumulation of burnt and corroded crusts, such as form on the old types of flat point soldering irons. My iron need not be filed and tinned as is true of old types of irons. While the bores 30 and 32 effectively retain the molten solder, the solder flows with sufficient ease to permit good work to be done. Bores of the type described fill easily and quickly with the molten solder, the bores functioning as a suction passage which causes the solder to fill the nozzle. The iron maintains a uniform working temperature.

Without further elaboration, the foregoing will so fully explain my invention, that others may, by applying current knowledge, readily adapt the same for use under various conditions of service.

I claim.

1. A soldering iron comprising a head having a bore extending therethrough, a shank extending laterally from the head and provided with a bore extending longitudinally therethrough, a nozzle extending through the bore of the head and provided with a convex lower end, the nozzle being provided with a comparatively narrow elongated passage extending axially therethrough with its upper end open to the atmosphere and having its upper portion of greater diameter than its lower portion, said passage being adapted, when the nozzle is heated and its lower end is dipped in molten solder, to draw the solder therein by capillary attraction, and means removably securing the nozzle to the head, said shank providing means through the medium of which the nozzle may be manipulated and providing means for conducting heat to the nozzle.

2. A soldering iron comprising a relatively large head, a relatively small shank extending laterally from one face thereof and provided with a bore extending longitudinally therethrough and into the head, said head having a vertical bore therethrough and intersecting the bore leading from the shank, a heater surrounding said shank, a nozzle removably extending through the bore of the head and provided with a convex lower end and with a passage extending therethrough within the head, its lower end below the head and considerably restricted and extending through the convex lower end.

EUGENE H. RUSTIN.

REFERENCES CITED

The following references are of record in the file of this patent:

UNITED STATES PATENTS

| Number | Name | Date |
| --- | --- | --- |
| 650,643 | Hurlimann, Jr. | May 29, 1900 |
| 672,433 | Arnaman et al. | Apr. 23, 1901 |
| 944,805 | Mead | Dec. 28, 1909 |
| 1,186,773 | Harris | June 13, 1916 |
| 1,626,552 | Quillen | Apr. 26, 1927 |
| 1,639,537 | Sanberg et al. | Aug. 16, 1927 |
| 1,908,056 | Ring et al. | May 9, 1933 |
| 1,957,325 | Davis | May 1, 1934 |
| 2,054,506 | Leitsch | Sept. 15, 1936 |
| 2,142,340 | Williams | Jan. 3, 1939 |